No. 831,618. PATENTED SEPT. 25, 1906.
J. W. LEDOUX.
AUTOMATIC VALVE.
APPLICATION FILED OCT. 14, 1905.

WITNESSES:

INVENTOR
John W. Ledoux
BY
Charles N. Butler
ATTORNEY.

UNITED STATES PATENT OFFICE.

JOHN W. LEDOUX, OF SWARTHMORE, PENNSYLVANIA, ASSIGNOR TO SIMPLEX VALVE AND METER COMPANY, A CORPORATION OF NEW JERSEY.

AUTOMATIC VALVE.

No. 831,618.  Specification of Letters Patent.  Patented Sept. 25, 1906.

Application filed October 14, 1905. Serial No. 282,752.

*To all whom it may concern:*

Be it known that I, JOHN W. LEDOUX, a citizen of the United States, residing at Swarthmore, in the county of Delaware and State of Pennsylvania, have invented certain Improvements in Automatic Valves, of which the following is a specification.

This invention relates to automatic valves such as are adapted for permitting the escape of air or other gas while preventing the escape of water or other liquid from conduits, receptacles, and the like; and its leading object is to improve the character of such valves with respect to certainty of action and economy of construction.

In its preferred form the mechanism comprises a shell having an inlet-passage which is adapted for connection with a liquid conduit or receptacle and a discharge-passage, the shell being balanced and reciprocating, so that the passage therefrom is opened to permit the escape of air from the conduit or receptacle and closed when the air having escaped water flows into the shell.

Figure 1:
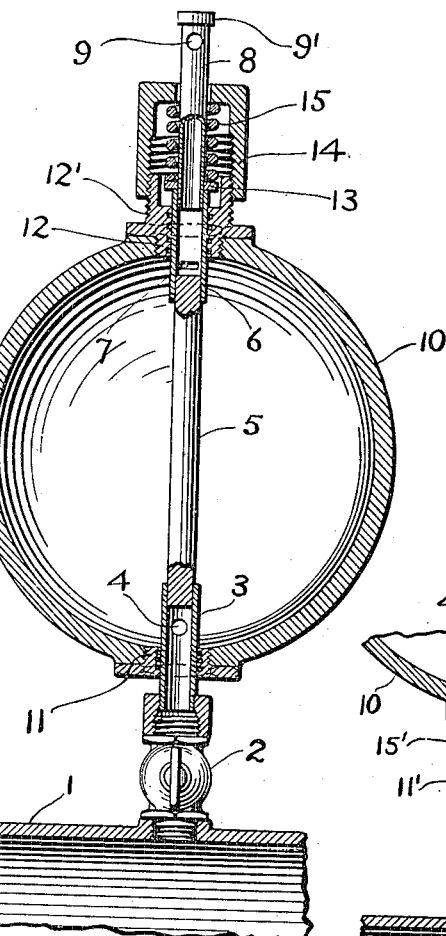
Figure 2:
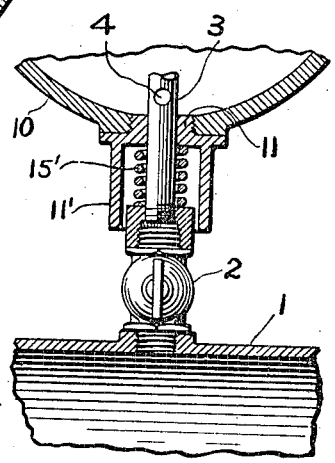
Figure 3:
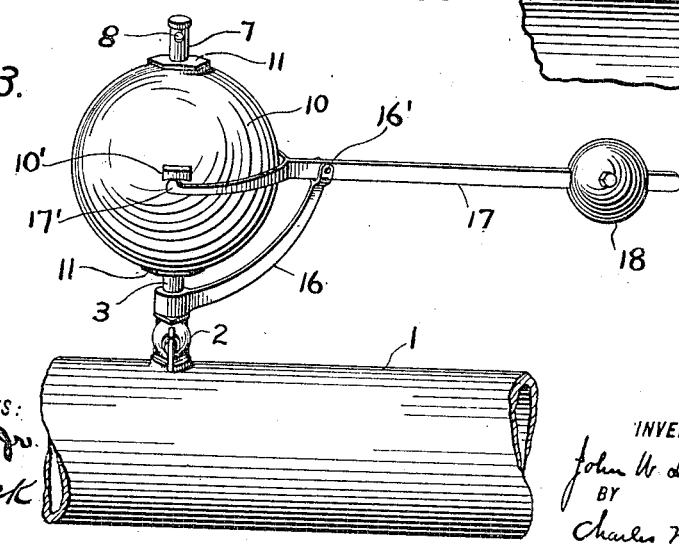

In the accompanying drawings, Figure 1 represents a sectional elevation of mechanism embodying the invention. Fig. 2 represents a broken sectional elevation showing a modification in the spring balancing mechanism shown in Fig. 1; and Fig. 3 represents a side elevation of a further modification of the invention, showing a lever mechanism for balancing the shell.

In the drawings, the conduit 1 is connected by a valve-coupling 2 with a tube 3, having a lateral aperture 4 therein. A rod 5 is set in the top of the tube 3 and in the bottom of a tube 6, having a lateral aperture 7 therein. A tube 8, telescoped in and fixed to the tube 6, has a lateral aperture 9 therein and a cap 9' thereon. There is thus provided a stem vertically disposed, having a passage leading from the conduit and a passage separated therefrom, constructed and capped to prevent clogging by the dropping or settling therein of obstructive matter.

A closed shell 10, reciprocating on the stem, has set therein the water or fluid packing-ring 11, which reciprocates on the tube 3, and the water or fluid packing-ring 12, which reciprocates on the tube 6. The outlet-passage from the shell through the tubes 6 and 8 is closed when the shell is down and opened when it is up through the closing and opening of the port or aperture 7 by the ring 12, the port or aperture 4 remaining open.

As shown in Fig. 1, the tubes 6 and 8 have fixed thereto a flange 13, and the ring 12 has thereon an extension 12', on which is screwed a hood 14, adapted to reciprocate on the tube 8, a coiled spring 15 being placed on the tube between the flange and the top of the hood to balance the shell.

As shown in Fig. 2, the ring 11 has thereon a hood 11', which incloses a coiled spring 15', placed on the tube 3 between the coupling 2 and the ring 11 to balance the shell.

As shown in Fig. 3, an arm 16 is supported by the coupling 2 and tube 3 and has a pivotal bearing 16', on which is fulcrumed a lever 17, the bifurcated short arms of the lever being provided with round bearings 17', on which rest bearings 10' of the shell, which is balanced by the counterweight 18.

In operation it will be understood that with the shell-balance properly adjusted therefor the passages through the shell will be held open normally, and consequently air or other gas in the conduit is permitted to escape therethrough. When, however, the lighter fluid has escaped and water or other liquid flows into the shell, the latter is depressed and the passage leading therefrom is closed to prevent the escape of such liquid.

Having described my invention, I claim—

1. An automatically opening and closing valve comprising a reciprocating shell, a passage discharging into said shell, and a passage through which said shell discharges, said shell moving under the influence of the weight of its contents to open and close one of said passages.

2. An automatic valve comprising a reciprocating shell, means for balancing said shell, an inlet to said shell and an outlet from said shell, said outlet being opened and closed by the admission of fluids of various densities thereto.

3. An automatic valve comprising a shell, means for balancing said shell, a passage discharging into said shell, a conduit connected with said passage, and a passage through which said shell discharges, the outlet from said shell being open normally and closed by the admission to said shell of a fluid of greater density than that normally contained therein.

4. An automatic valve comprising a shell, and a stem extending therethrough on which said shell reciprocates, said stem having a passage leading to said shell and a passage leading therefrom.

5. An automatic valve comprising a shell, a stem extending through and on which said shell reciprocates, said stem having a passage leading to said shell and a passage leading therefrom, and means for balancing said shell on said stem.

In testimony whereof I have hereunto set my hand, this 9th day of October, 1905, in the presence of the subscribing witnesses.

JOHN W. LEDOUX.

Witnesses:
ROBERT JAMES EARLEY,
UTLEY E. CRANE, Jr.